US007356429B2

(12) United States Patent
Eskildsen

(10) Patent No.: US 7,356,429 B2
(45) Date of Patent: Apr. 8, 2008

(54) METHOD FOR REMOTELY CHANGING THE SENSITIVITY OF A WIRELESS SENSOR

(75) Inventor: Kenneth G Eskildsen, Great Neck, NY (US)

(73) Assignee: Honeywell International, Inc., Morristown, NJ (US)

( * ) Notice: Subject to any disclaimer, the term of this patent is extended or adjusted under 35 U.S.C. 154(b) by 158 days.

(21) Appl. No.: 10/893,037

(22) Filed: Jul. 15, 2004

(65) Prior Publication Data

US 2006/0012472 A1 Jan. 19, 2006

(51) Int. Cl.
*G01C 19/00* (2006.01)

(52) U.S. Cl. ........................................ 702/104

(58) Field of Classification Search ................ 702/104
See application file for complete search history.

(56) References Cited

U.S. PATENT DOCUMENTS 4,245,217 A * 1/1981 Steinhage .................. 340/555
6,914,534 B2 * 7/2005 Tanguay .................. 340/628
6,989,746 B2 * 1/2006 Rasmussen ................ 340/541

OTHER PUBLICATIONS

Horowitz and Hill, "The Art of Electronics", 1989, Cambridge University Press, pp. 635-636.*

* cited by examiner

*Primary Examiner*—John Barlow
*Assistant Examiner*—Stephen J. Cherry
(74) *Attorney, Agent, or Firm*—Dalia S. Grimberg; John Beninati; Robert S. Smith

(57) ABSTRACT

Apparatus for remotely changing the sensitivity of a sensor in a security system which includes at least a first sensor having at least first and second outputs corresponding respectively to first and second sensitivity settings, and programmable apparatus cooperating with the first and second outputs of the first sensor. The programmable apparatus is programmable to operatively connect one of the first and second outputs. The apparatus also includes a transmitter coupled to the sensor for transmitting the output of the sensor to an associated security system alarm panel. The invention also includes the method for remotely changing the sensitivity of a sensor in a security system which includes providing at least a first sensor having at least first and second outputs corresponding respectively to first and second sensitivity settings, providing a programmable apparatus for operatively connecting one of the first and second outputs of the first sensor.

44 Claims, 4 Drawing Sheets

METHOD FOR REMOTELY CHANGING THE SENSITIVITY OF A WIRELESS SENSOR

BACKGROUND OF THE INVENTION

This invention relates to security systems, wireless sensors for security systems, and to apparatus and methods to remotely adjust the sensitivity of such devices. Thus, a single sensor may be used in many different applications. The types of sensors to which the invention pertains include, but are not limited to, glass break, asset, dual technology, motion sensors, temperature sensors and shock sensors. For example, a motion sensor may have low, medium, and high sensitivity outputs to accommodate different room environments. Such low, medium, and high sensitivity outputs may, for example, correspond respectively to an intruder taking three steps, two steps, or one step in a protected space.

At the time of the installation of a security system sensor, the installer will choose the sensitivity of the sensor by setting switches within the housing of the sensor. If, at a later date, it is determined that the switch setting within the housing is not correct in the prior art apparatus, the installer will be required to return to the worksite and to the sensor to change the settings.

SUMMARY OF THE INVENTION

A general object of the invention is to reduce the cost of installing security systems.

Another object invention is to permit remote adjustability of installed security system sensors.

Still another object of the invention is to eliminate the need for an installer to make repetitive visits to a protected premise.

It is an object of the invention to provide a method and system including a sensor having multiple sensitivity outputs that can be configured remotely, so that the installer does not need to return the job site to change the sensitivity setting.

It has now been found that these and other objects of the invention may be attained in apparatus for remotely changing the sensitivity of a sensor in a security system which includes at least a first sensor having at least first and second outputs corresponding respectively to first and second sensitivity settings, a transmitter cooperating with the first sensor for transmitting the first and second outputs, an alarm panel including a control system and programmable apparatus, a receiver cooperating with the alarm panel for receiving the first and second outputs, the programmable apparatus being programmable to operatively connect one of the first and second outputs to the control system of the alarm panel.

Some forms of the apparatus includes an application specific integrated circuit (ASIC), a microcontroller, and/or discrete components. The sensors may be selected from the group that includes a passive infrared sensor, a glass break detector, a temperature sensor, an asset sensor, dual technology sensor, a motion sensor, and a shock sensor.

The security system for protected premises may include an alarm panel in communication with an associated central-station that includes programmable apparatus and control apparatus in addition to communications apparatus cooperating with the alarm panel for receiving and sending data from and to the associated central station, at least a first sensor having at least first and second outputs corresponding respectively to first and second sensitivity settings, a transmitter associated with the at least a first sensor for transmitting the first and second outputs to the control panel; and the programmable apparatus in the control panel is programmable to operatively connect one of the first and second outputs to the control apparatus.

The security system may include output signal processing apparatus that includes an application specific integrated circuit (ASIC), a microcontroller, and/or discrete components. The sensors may be selected from the group that includes a passive infrared sensor, a glass break detector, a temperature sensor, an asset sensor, dual technology sensor, a motion sensor, and a shock sensor.

The invention also includes the method for remotely changing the sensitivity of a sensor in a security system which includes providing at least a first sensor having at least first and second outputs corresponding respectively to first and second sensitivity settings, providing a transmitter for transmitting the first and second outputs, providing a receiver for receiving each output of the transmitter, and providing a programmable apparatus that is programmable to operatively connect one of the first and second outputs.

The method for remotely changing the sensitivity of a sensor in a security system may further includes the step of sensor output signal processing that utilizes an application specific integrated circuit (ASIC), a microcontroller and/or discrete components. The method may include utilizing one or more sensors selected from the group that includes a passive infrared sensor, a glass break detector, a temperature sensor, an asset sensor, dual technology sensor, a motion sensor, and a shock sensor.

Another embodiment of the method for providing a security system that includes the capability of remotely changing the sensitivity of a sensor in the security system includes providing an alarm panel in communication with an associated central-station, providing at least a first sensor having at least first and second outputs corresponding respectively to first and second sensitivity settings, providing a transmitter cooperating with the first sensor for transmitting at least the first and second outputs, providing a receiver cooperating with the alarm panel for receiving data from the sensor and providing programmable apparatus in the alarm panel for utilizing one of the first and second outputs.

BRIEF DESCRIPTION OF THE DRAWING

The invention will be better understood by referencing the accompanying drawing in which.

DESCRIPTION OF THE PREFERRED EMBODIMENTS

There is a variety of security systems intended for homeowners, business owners, and other potential targets for burglary, that are monitored by a central station. These systems are vastly superior to older systems that merely sound a bell or alarm. They have also largely replaced systems that were tied in directly to the local police station. As the use of burglar alarms increased, the local police departments began turning down more and more requests to be "hooked-up." As a result, there became a demand for central stations, or companies whose specialty it was to simply monitor burglar alarms. Most police departments will still allow banks and large jewelry stores a direct link to the police station, but as a rule, homeowners are excluded. So as the demand for security has risen, many guard agencies and burglar alarm installers have begun to offer centralized monitoring as an option for their clients.

When such systems are installed, it is common for them to be connected by a dedicated telephone line to the central station. Other systems utilize radio frequency and the internet to connect to the central station. In the event of an intrusion, the alarm panel (also known as a security panel or control panel) on the premises being monitored calls up the central station and gives an electronic message to the answering computer. It tells the computer exactly which switch or sensor has been violated, and the computer then tells the operator what has happened. For example, if a burglar entered through a broken window, the panel would connect with the computer and tell it that zone 4, a first floor window, has been broken. The operator would then see on his computer screen a display indicating, for example, that in the Johnson residence, in zone 4, the foil on the living room window, violated. As the thief progresses through the house, the panel would call the computer for every sensor that was violated. The operator may then receive status that in zone 17, a passive Infrared detector in the master bedroom, has detected someone. In some cases, pre-amplified microphones allow audio monitoring of the protected premises. The operator would then be fairly sure someone was in the house, so the operator would have three options. The operator may just send the companies guards to the scene, call 911 and dispatch the police, or the operator may send both the police and the guards.

Passive infrared alarms are so called because they do not emit Infrared energy, but merely detect a change in Infrared energy. A PIR sensor probes its monitoring area, and if any changes are detected in Infrared (heat), it triggers an alarm. A PIR records the ambient room temperature so it will notice any changes in IR such as those that are produced by the human body. Slow temperature changes, such as thermostatically controlled heating systems, will not interfere with the PIR's function.

Figure 3:
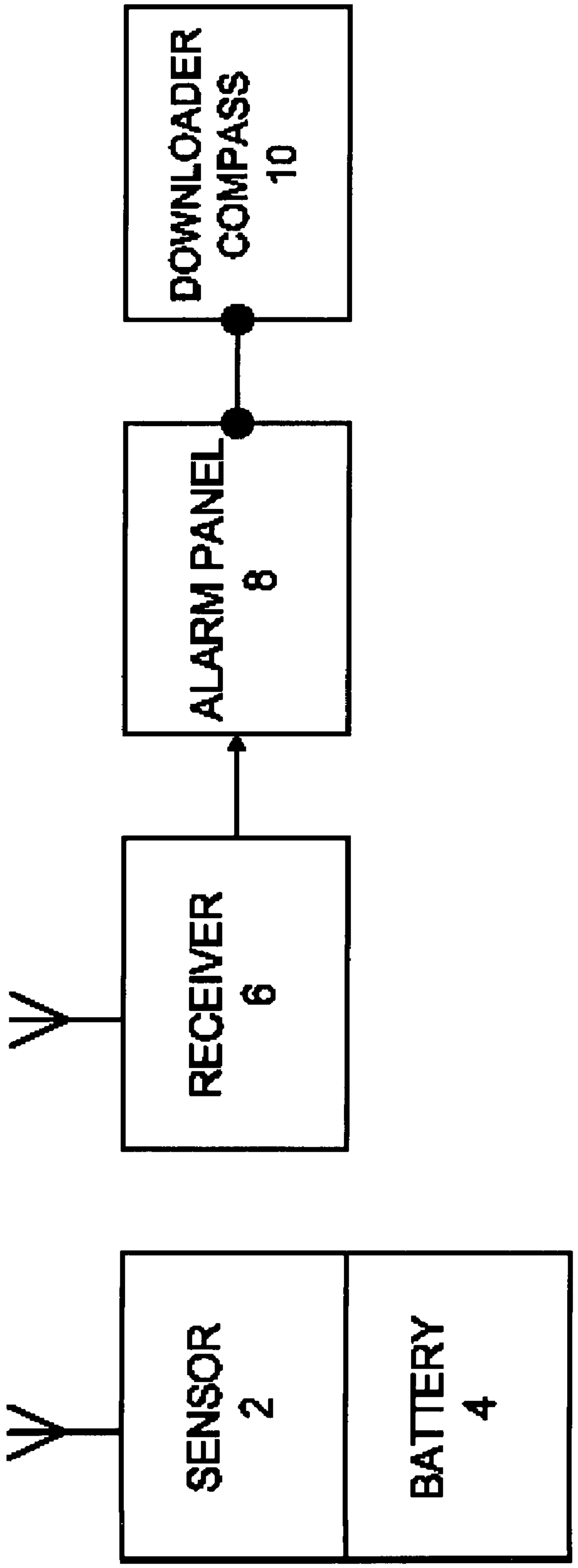
FIG. 3 is a schematic block diagram of a prior art wireless security system.

Referring now to the drawings, there is shown in FIG. 3 a conventional sensor, such as a passive infrared (PIR) sensor 2 having a single sensitivity level operatively connected. The sensors 2 utilize switches (not shown) to connect one of a plurality of sensitivity levels at any given instant, are coupled to a battery 4, and include an internal transmitter and an antenna for transmitting a signal corresponding to the sensed parameter. Commercially available devices of this type are manufactured and sold by Honeywell and identified by the designation Ademco 5890 or 5894. Customarily the wireless sensor 2 is constructed and programmed to issue a signal at a predetermined interval to confirm the presence and operability of the sensor 2. For example, such a signal may be sent at an interval of once every hour to confirm to an alarm panel that the sensor has not been stolen or become inoperative.

The signal from the sensor 2 is transmitted to a receiver 6 that is configured to receive the signal from the sensor 2.

Commercially available devices of this type are manufactured by Honeywell and are identified by the designation Ademco 5881.

The receiver 6 is physically connected to an alarm panel 8. A commercially available alarm panel 8 for such an application is manufactured by Honeywell and identified by the designation VISTA 50.

Typically, the alarm panel 8 is coupled by a phone line to a microcomputer running control software whereby the alarm panel 8 may be remotely controlled. One commercially available software program for such purposes is marketed by Honeywell and identified as the Ademco Compass Downloader 10. This software permits a user to remotely program and control an alarm system. The user may do so from the comfort of an office and will allow the user to download and upload alarm control information, to compare the upload and saved information, and to view the results either on a screen or any printed report. The Compass Downloader enables programming from an office prior to installation. Alternatively, initial programming can be downloaded from a remote location or at a job site using a personal computer with a commercially available serial module such as the Honeywell/Ademco 4100SM (where the alarm panel supports it).

The Ademco Compass Downloader for Windows Software 10 is network compatible software that provides a quick and easy method for planning, designing and communicating with the alarm panels. With this software the user can upload system programming that has been manually entered into the panel, or previously downloaded. The Compass change feature reviews all system changes initiated by the download operator within the current session.

A complete record of system modifications and the history of an account are also available.

With this prior art apparatus, the installer will choose the sensitivity of the sensor 2 by setting switches (not shown) within the housing of the sensor 2. If, at a later date, it is determined that the switch setting within the housing is not correct, the installer will be required to return to the worksite and to the sensor 2 to change the settings.

Figure 1:
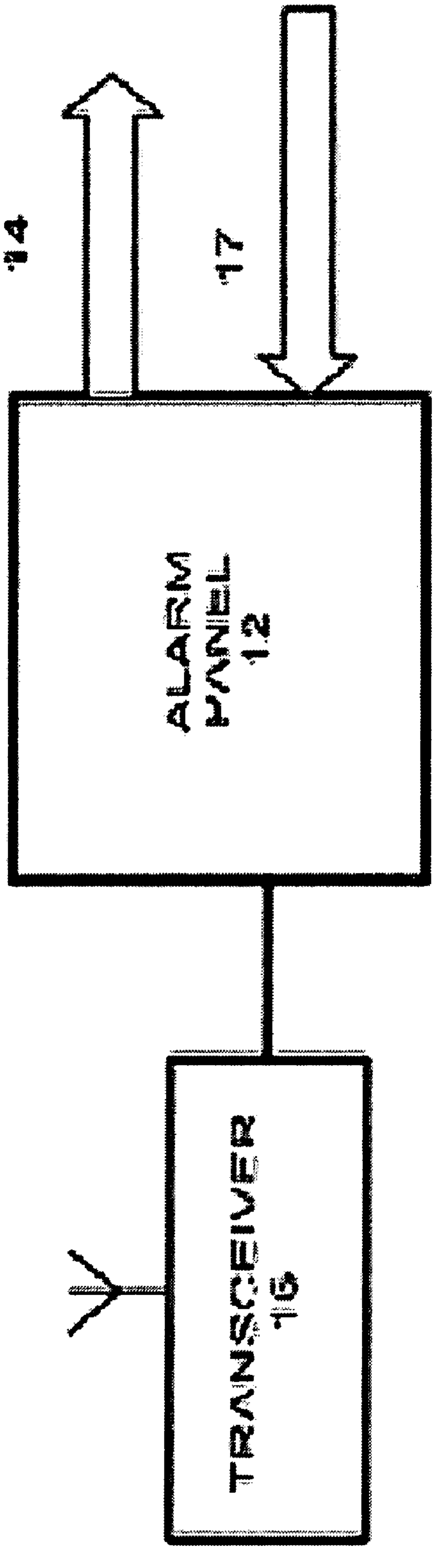
FIG. 1 PRIOR ART
FIG. 1 is a schematic block diagram of a prior art security system in which the present invention may be implemented.
Figure 2:
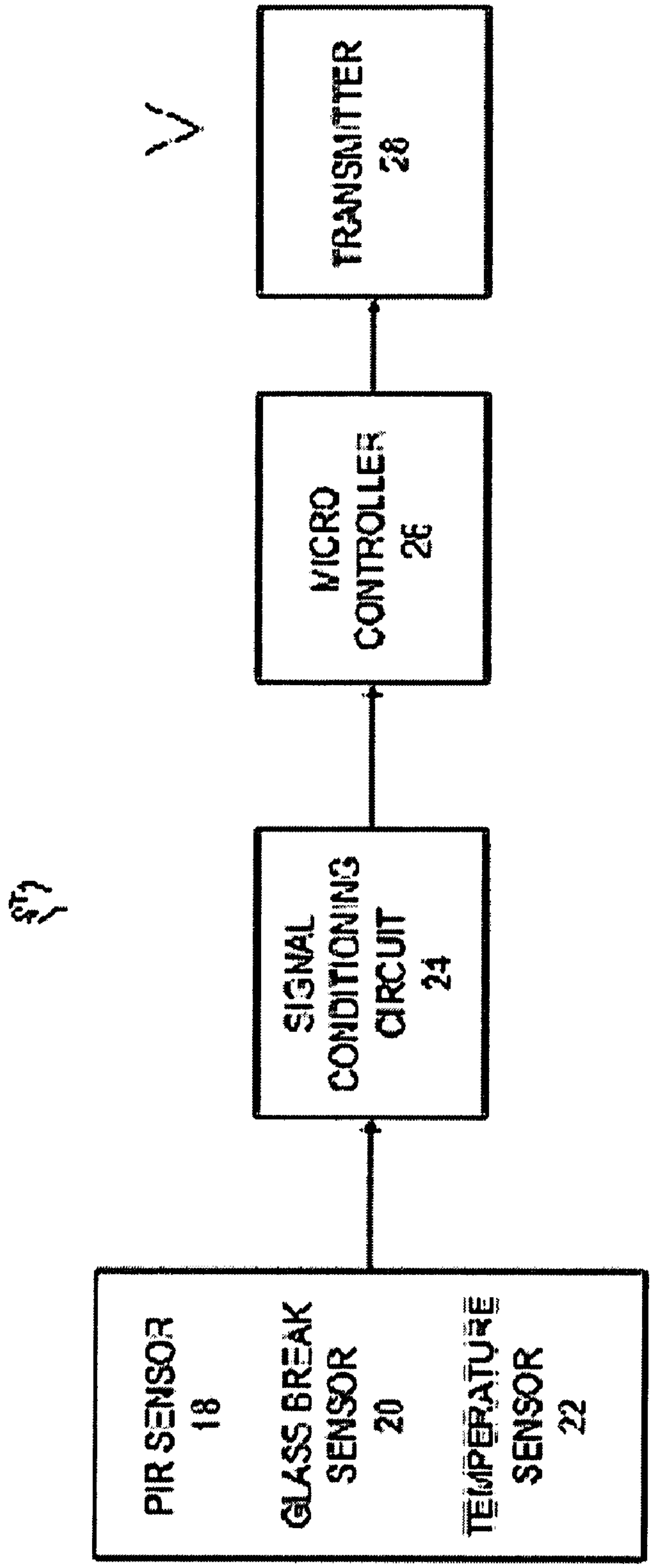
FIG. 2 is a schematic block diagram of a sensor which includes one form, of the present invention is implemented in one form. For simplicity, power supplies supplying each block have not been shown.

Referring now to FIGS. 1 and 2 there is shown respective parts of schematic block diagram of a security system in accordance with one embodiment of the present invention. While the invention has application to at least glass break, asset, dual technology, motion, temperature and shock sensors the block diagram illustrates only a passive infrared sensor 18, a glass break detector 20 and a temperature sensor 22. The passive infrared sensor 18 may have varying sensitivities such as to the number of steps that an intruder has taken within the protected premises. The temperature sensor 22 may have different sensitivities corresponding respectively to cold, warm and hot. The glass break detector 20 may have respective sensitivities respectively corresponding to the distance between the detector and the protected glass.

Each of the sensors 18, 20, 22 is a wireless sensor that communicates with a receiver 16 coupled to an alarm panel 12. The alarm panel 12 has incoming communication 17 and outgoing communication 14 via telephone, Internet or other communications networks such as the ALARMNET communications system. The ALARMNET communications network is a nationwide service provider delivering a wide range of products and services for supervised alarm signal transport applications. The ALARMNET communications network is operated by Honeywell.

Referring now to FIG. 2 there is shown a block diagram of a typical sensor, such as a passive infrared sensor 18, a glass break detector 20 or a temperature sensor 22, together with associated circuitry for cooperation with the apparatus shown in FIG. 1. The types of sensors to which the invention pertains include, but are not limited to, glass break, asset, dual technology, motion sensors, temperature sensors and shock sensors.

Each of the sensors 18, 20, 22 may have a plurality of discrete outputs corresponding, for example, to low, medium and high sensitivity settings and means to remotely configure the sensitivity of the sensor by remotely connecting one of the plurality of discrete outputs The sensor outputs a signal for each sensitivity threshold. For example, if the PIR has one, two, and three footstep thresholds, an alarm output will be sent after the intruder takes one step; a second output will be sent after the intruder takes a second step; a third output will be sent after the intruder takes a third step. The control panel will receive all of these signals and must be programmed to respond to only one. The programming can be done at the keypad or remotely via the Compass program.

Figure 4:
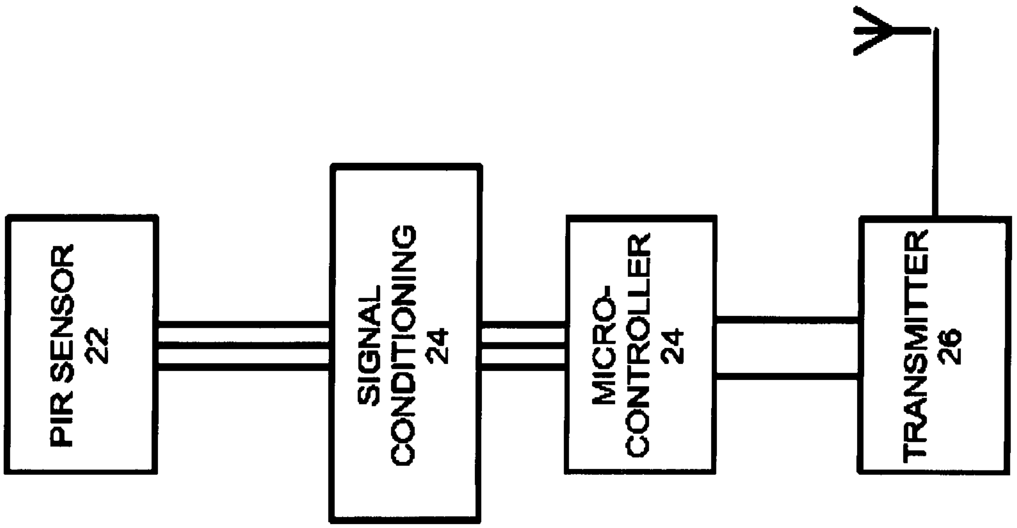
FIG. 4 is a schematic block diagram of a typical sensor, similar to FIG. 2, of apparatus in accordance with the present invention illustrating in greater detail multiple outputs from a single PIR sensor.

The apparatus and method of the present invention is still further illustrated in FIG. 4 which is a schematic block diagram of a typical sensor, similar to FIG. 2, of apparatus in accordance with the present invention illustrating in greater detail multiple outputs from a single PIR sensor 22. It will be understood that this illustration is exemplary of the multiple outputs produced by each of the sensors in a in accordance with her for embodiments of the present invention. Similarly, it will be understood that the multiple outputs have outputs corresponding to respective sensitivities.

With the apparatus and method of the present invention the available loop numbers of the sensor are assigned to the different sensitivity settings required. At the time the sensor is programmed into the panel, the installer chooses the wireless loop number associated with the desired sensitivity. To change the sensitivity at a later date, the installer can use a downloader to remotely change the loop number operatively connected to the panel 12.

Each sensor, for example a passive infrared sensor (PIR) 18 may have multiple outputs that are respectively produced (triggered or alarmed) in response to three discrete sensitivity levels. In other words, For example, the sensor may have low, medium and high sensitivity outputs. These outputs may, for example, correspond respectively to an intruder that has taken three, two, or one steps within protected premises.

The output of each sensor 18, 20, 22 is connected to a signal conditioning circuit 24 in the customary manner. The output of the signal conditioning circuit 24 is connected to a microcontroller 26. In a preferred embodiment of the present invention, the microcontroller is chosen from the MSP430 series from Texas Instruments. The MSP430 is an inexpensive ultra-low power RISC based microcontroller. When a weak motion signal is detected, the high sensitivity output would go into the alarm state and an alarm signal would be transmitted to the panel. If a strong motion signal is detected all three signals will be transmitted to the microcontroller, then to the panel. The panel is programmed to only respond to the loop associated with the desired sensitivity setting. For high sensitivity, the panel is programmed to respond to the loop number 3 transmissions. Programming of the panel 12 can be done locally at a keypad or remotely via the phone line.

Other forms the invention may utilize an application-specific integrated circuit, or a discrete component circuit. The embodiments that include an Application-Specific Integrated Circuit include a chip designed for a particular application (as opposed to the integrated circuits that control functions such as RAM in a PC). ASICs are built by connecting existing circuit building blocks in new ways. Since the building blocks already exist in a library, it is much easier to produce a new ASIC than to design a new chip from scratch. ASICs are commonly used in automotive computers to control the functions of the vehicle and in PDAs. The respective methods and systems in accordance with the present system may utilize a microcomputer that includes a microprocessor and memory and which cooperates with software that is commercially available or within the skill of practitioners in the programming arts. Although the present invention may employ an ASIC, those skilled in the art will recognize that in other embodiments discrete components may be utilized. The embodiments utilizing a microprocessor and memory will use software known or obvious to those skilled the art.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompass other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. Apparatus for remotely changing the sensitivity of a sensor in a security system which comprises:

- a first sensor for measuring a single ambient parameter having at least first and second outputs corresponding respectively to first and second sensitivity settings;
- a transmitter cooperating with said first sensor for transmitting said first and second outputs;
- an alarm panel including a control system and programmable apparatus;
- a receiver cooperating with said alarm panel for receiving said first and second outputs, said programmable apparatus being programmable to operatively connect one of said first and second outputs to said control system of said alarm panel.

2. Apparatus for remotely changing the sensitivity of a sensor as described in claim 1, wherein said apparatus includes an application specific integrated circuit (ASIC).

3. Apparatus for remotely changing the sensitivity of a sensor as described in claim 1, wherein said apparatus includes a microcontroller.

4. Apparatus for remotely changing the sensitivity of a sensor as described in claim 1, wherein said apparatus includes discrete components.

5. Apparatus for remotely changing the sensitivity of a sensor as described in claim 1, wherein said apparatus includes a passive infrared sensor.

6. Apparatus for remotely changing the sensitivity of a sensor as described in claim 1, wherein said apparatus includes a glass break detector.

7. Apparatus for remotely changing the sensitivity of a sensor as described in claim 1, wherein said apparatus includes a temperature sensor.

8. Apparatus for remotely changing the sensitivity of a sensor as described in claim 1, wherein said apparatus includes an asset sensor.

9. Apparatus for remotely changing the sensitivity of a sensor as described in claim 1, wherein said apparatus includes a dual technology sensor.

10. Apparatus for remotely changing the sensitivity of a sensor as described in claim 1, wherein said apparatus includes a motion sensor.

11. Apparatus for remotely changing the sensitivity of a sensor as described in claim 1, wherein said apparatus includes a shock sensor.

12. A security system for protected promises which comprises:

an alarm panel in communication with an associated central-station, said alarm panel including programmable apparatus and control apparatus;

communications apparatus cooperating with said alarm panel for receiving and sending data from and to the associated central station;

a first sensor for measuring a single ambient parameter having at least first and second outputs corresponding respectively to first and second sensitivity settings;

a transmitter associated with said at least a first sensor for transmitting said first and second outputs to said control panel; and said programmable apparatus in said control panel being programmable to operatively connect one of said first and second outputs to said control apparatus.

13. A security system as described in claim 12, wherein said system includes output signal processing apparatus that includes an application specific integrated circuit (ASIC).

14. A security system as described in claim 12, wherein said system includes output signal processing apparatus that includes a microcontroller.

15. A security system as described in claim 12, wherein said system includes output signal processing apparatus that includes discrete components.

16. A security system as described in claim 12, wherein said first sensor is a passive infrared sensor.

17. A security system as described in claim 12, wherein said first sensor is a glass break detector.

18. A security system as described in claim 12, wherein said first sensor is a temperature sensor.

19. A security system as described in claim 12, wherein said first sensor is an asset sensor.

20. A security system as described in claim 12, wherein said apparatus includes a dual technology sensor.

21. A security system as described in claim 12, wherein said first sensor is a motion sensor.

22. A security system as described in claim 12, wherein said first sensor is a shock sensor.

23. A method for remotely changing the sensitivity of a sensor in a security system which comprises:

providing a first sensor for measuring a single ambient parameter having at least first and second outputs corresponding respectively to first and second sensitivity settings;

providing a transmitter for transmitting the first and second outputs;

providing a receiver for receiver for receiving each output of said transmitter;

providing a programmable apparatus that is programmable to operatively connect one of said first and second outputs.

24. A method for remotely changing the sensitivity of a sensor in a security system as described in claim 23 further includes the step of sensor output signal processing that utilizes an application specific integrated circuit (ASIC).

25. A method for remotely changing the sensitivity of a sensor in a security system as described in claim 23 further includes the step of sensor output signal processing that utilizes a microcontroller.

26. A method for remotely changing the sensitivity of a sensor in a security system as described in claim 23 further includes the step of sensor output signal processing that utilizes discrete components.

27. A method for remotely changing the sensitivity of a sensor in a security system as described in claim 23 wherein the step of providing a sensor includes providing a sensor that is a passive infrared sensor.

28. A method for remotely changing the sensitivity of a sensor in a security system as described in claim 23 wherein the step of providing a sensor includes providing a sensor that is a glass break detector.

29. A method for remotely changing the sensitivity of a sensor in a security system as described in claim 23 wherein the step of providing a sensor includes providing a sensor that is a temperature sensor.

30. A method for remotely changing the sensitivity of a sensor in a security system as described in claim 23 wherein the step of providing a sensor includes providing a sensor that is an asset sensor.

31. A method for remotely changing the sensitivity of a sensor in a security system as described in claim 23 wherein the step of providing a sensor includes providing a sensor that is a dual technology sensor.

32. A method for remotely changing the sensitivity of a sensor in a security system as described in claim 23 wherein the step of providing a sensor includes providing a sensor that is a motion sensor.

33. A method for remotely changing the sensitivity of a sensor in a security system as described in claim 23 wherein the step of providing a sensor includes providing a sensor that is a shock sensor.

34. A method for providing a security system that includes the capability of remotely changing the sensitivity of a sensor in the security system which comprises:

providing an alarm panel in communication with an associated central-station;

providing a first sensor for measuring a single ambient parameter having at least first and second outputs corresponding respectively to first and second sensitivity settings;

providing a transmitter cooperating with said first sensor for transmitting at least the first and second outputs;

providing a receiver cooperating with said alarm panel for receiving data from the sensor; and providing programmable apparatus in the alarm panel for utilizing one of said first and second outputs.

35. A method for providing a security system that includes the capability of remotely changing the sensitivity of a sensor in the security system as described in claim 34 further includes the step of sensor output signal processing that includes an application specific integrated circuit (ASIC).

36. A method for providing a security system that includes the capability of remotely changing the sensitivity of a sensor in the security system as described in claim 34 further includes the step of sensor output signal processing that includes a microcontroller.

37. A method for providing a security system that includes the capability of remotely changing the sensitivity of a sensor in the security system as described in claim 34 further includes the step of sensor output signal processing that includes discrete components.

38. A method for providing a security system that includes the capability of remotely changing the sensitivity of a sensor in the security system as described in claim 34 wherein the step of providing a sensor includes providing a sensor that is a passive infrared sensor.

39. A method for providing a security system that includes the capability of remotely changing the sensitivity of a sensor in the security system as described in claim 34 wherein the step of providing a sensor includes providing a sensor that is a glass break detector.

40. A method for providing a security system that includes the capability of remotely changing the sensitivity of a sensor in the security system as described in claim 34 wherein the step of providing a sensor includes providing a sensor that is a temperature sensor.

41. A method for providing a security system that includes the capability of remotely changing the sensitivity of a sensor in the security system as described in claim 34 wherein the step of providing a sensor includes providing a sensor that is an asset sensor.

42. A method for providing a security system that includes the capability of remotely changing the sensitivity of a sensor in the security system as described in claim 34 wherein the step of providing a sensor includes providing a sensor that is a dual technology sensor.

43. A method for providing a security system that includes the capability of remotely changing the sensitivity of a sensor in the security system as described in claim 34 wherein the step of providing a sensor includes providing a sensor that is a motion sensor.

44. A method for providing a security system that includes the capability of remotely changing the sensitivity of a sensor in the security system as described in claim 34 wherein the step of providing a sensor includes providing a sensor that is a shock sensor.

* * * * *